(12) United States Patent
Batdorff et al.

(10) Patent No.: US 7,641,289 B2
(45) Date of Patent: Jan. 5, 2010

(54) DRIVE AWAY AXLE ASSEMBLY

(75) Inventors: Jonathan D. Batdorff, Fort Wayne, IN (US); James J. Korson, Auburn, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 67 days.

(21) Appl. No.: 12/054,541

(22) Filed: Mar. 25, 2008

(65) Prior Publication Data

US 2009/0243373 A1  Oct. 1, 2009

(51) Int. Cl.
*B60B 35/00* (2006.01)
*B60B 27/00* (2006.01)

(52) U.S. Cl. .................. 301/137; 301/105.1; 301/124.1

(58) Field of Classification Search ...................... 301/1, 301/6.1, 105.1, 111.01, 111.03, 124.1, 126, 301/131, 132, 137; 180/240, 385; 295/37, 295/44, 47; 403/1
See application file for complete search history.

(56) References Cited

U.S. PATENT DOCUMENTS

| | | | | |
|---|---|---|---|---|
| 935,061 A * | 9/1909 | Roulstone | ............... | 301/111.03 |
| 2,532,605 A * | 12/1950 | Castleberry | ................... | 301/1 |
| 2,568,834 A * | 9/1951 | Streifthau | ..................... | 301/1 |
| 2,599,013 A * | 6/1952 | Pringle | ..................... | 301/6.1 |
| 3,992,120 A * | 11/1976 | Recker | ......................... | 403/317 |
| 4,334,590 A * | 6/1982 | Plumb | ........................ | 180/247 |
| 4,351,407 A * | 9/1982 | Call | ............................ | 180/385 |
| 4,528,107 A * | 7/1985 | McCaffrey et al. | ............ | 252/61 |
| 4,986,608 A * | 1/1991 | Fett | ......................... | 301/124.1 |
| 5,060,750 A | 10/1991 | Klages | | |
| 5,658,053 A * | 8/1997 | Vencill et al. | ............ | 301/105.1 |
| 6,102,489 A * | 8/2000 | Boese et al. | ................ | 301/137 |
| 6,368,242 B1 | 4/2002 | Irwin | | |
| 6,520,597 B1 * | 2/2003 | Markling | ............... | 301/64.701 |
| 6,676,228 B1 * | 1/2004 | Varela et al. | ................ | 301/137 |
| 6,761,237 B2 | 7/2004 | Brissette et al. | | |
| 7,413,261 B2 * | 8/2008 | De Freitas | ............... | 301/105.1 |

* cited by examiner

*Primary Examiner*—S. Joseph Morano
*Assistant Examiner*—Kip T Kotter
(74) *Attorney, Agent, or Firm*—Jeffrey P. Calfa; Mark C. Bach

(57) ABSTRACT

The drive away axle assembly comprises at least an axle shaft having a proximal end seated within an axle housing and a distal terminal flange and a hub having a distal end land and a sidewall. The distal terminal flange of the axle shaft has bores therein which align with threaded bores in the distal end land of the hub, and axle shaft/hub connectors engage through the bores to removably connect the hub to the axle shaft. Further, an axle shaft retaining bolt extends through the sidewall of the hub for engagement with the axle shaft structures to maintain the axle shaft within the axle housing when the axle shaft/hub connectors are removed. Upon removal of such connectors, the hub rotates freely without imparting rotation to the axle shaft. Still further, an accessory spring may be provided for assisting in disengagement of the axle shaft flange from the hub.

9 Claims, 2 Drawing Sheets

US 7,641,289 B2

DRIVE AWAY AXLE ASSEMBLY

BACKGROUND OF THE INVENTION

1. Field of Invention

The present invention relates to a rear vehicle axle assembly. More particularly, the invention relates to a drive away axle assembly which does not need to be removed and stored during transport of the vehicle, such as to a dealer, via towing thereof, and eliminates need of reinstallation and actions accessory to such reinstall.

2. Prior Art

It is not believed that such structure has heretofore been proposed.

Presently, rear axle shafts must be completely removed from the axle housing before the vehicle can be towed without damage to the drive train. The axle shafts must be strapped or otherwise attached to the frame when the vehicle is in transit.

The cone locks presently used in conjunction with the wheel end bolts to attempt to center the axle shafts make it very difficult to remove the axle shafts and the axle assembly frequently leaks oil from the axle shaft/wheel end (hub) interface.

The axle shaft is frequently not concentric with the spindle area of the axle housing.

The current method for filling the wheel end with oil creates a non-symmetrical assembly at the axle shaft/wheel end interface and the axles shafts must be reinstalled with a new gasket every time the axle shafts are removed.

Wheel end lube is filled through a hole created by leaving out one of the axle shaft mounting studs. A bolt is used to fill the void after filling.

The drive away axle assembly of the present invention, as described herein below, eliminates the need for axle disassembly, and thus requires less transportation preparation time, increases axle life, and decreases warranty cost.

SUMMARY OF THE INVENTION

According to the invention there is provided a drive away axle assembly comprising at least an axle shaft having a proximal end seated within an axle housing and a distal terminal flange and a hub having a distal end land and a sidewall, the distal terminal flange of the axle shaft having bores therein which align with threaded bores in the distal end land of the hub, axle shaft/hub connectors engaging through the bores to removably connect the hub to the axle shaft, and an axle shaft retaining bolt extending through the sidewall of the hub for engagement with the axle shaft structures to maintain the axle shaft within the axle housing when the axle shaft/hub connectors are removed. Further, an accessory spring may be provided for assisting in disengagement of the axle shaft flange from the hub.

DESCRIPTION OF THE PREFERRED EMBODIMENTS

Figure 1:
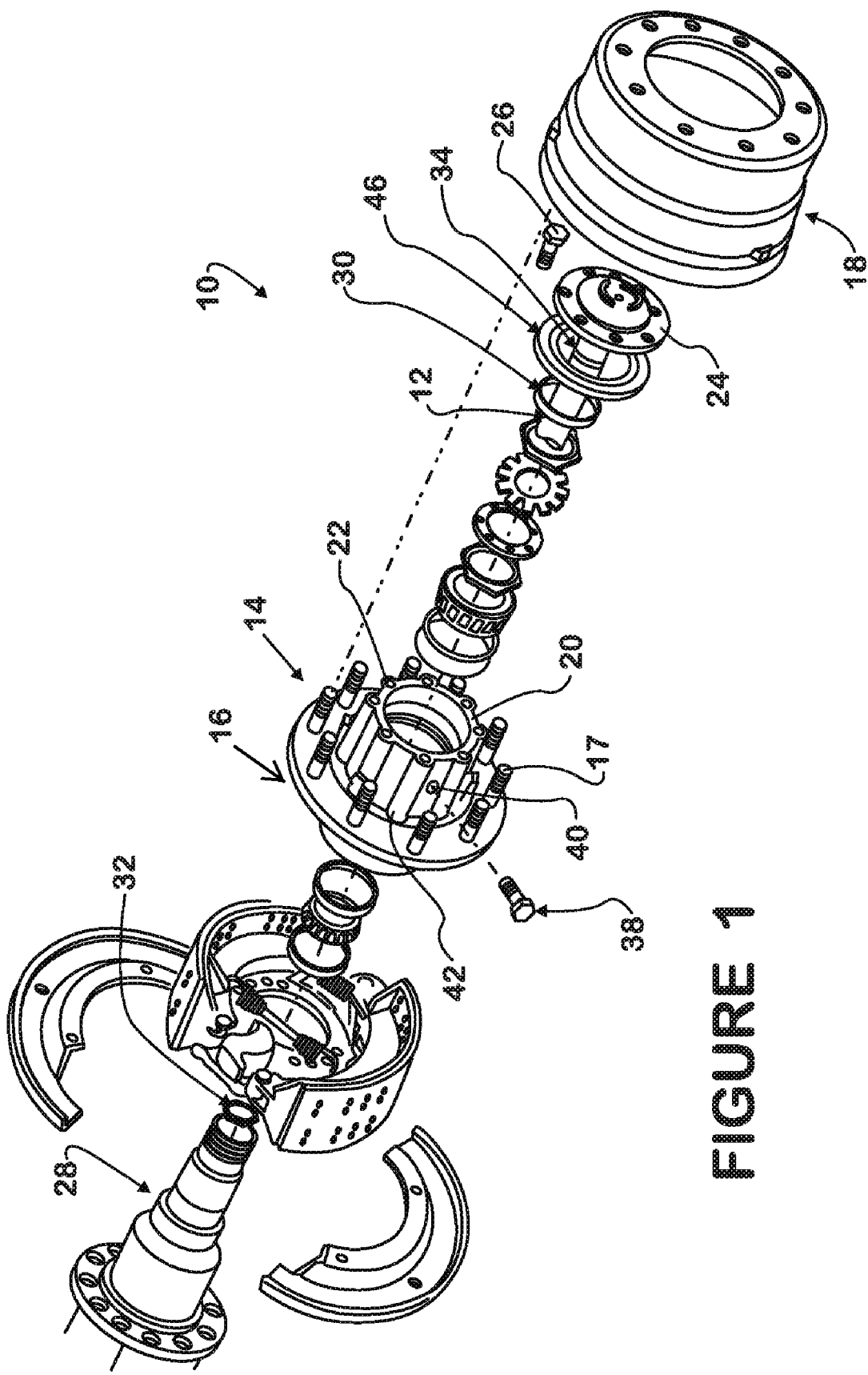
FIG. 1 is an exploded perspective view of the drive away axle assembly of the present invention.

Referring now to the Figures in greater detail, there is illustrated therein the drive away axle assembly of the present invention, generally identified by the reference numeral 10.

It will be understood first of all that the drawings are not to scale, to assist in necessary visualization of the invention. Further, as utilized herein, the term distal relates to the wheel end of the assembly 10 and the term proximal relates to the axle housing end of the assembly 10.

The improvement proposed herein affects the axle shaft 12 and wheel end carrier or hub 14 of the assembly 10 only. All other components of the assembly 10, as known in the relevant art, remain essentially the same.

With reference first to the hub 14, it will be understood that the flange 16 thereof incorporates a plurality of studs 17 thereon for use in engaging the brake drum 18 of assembly 10 thereto. However, studs typically provided on the distal land 20 of the hub 14 have been eliminated, leaving a plurality of threaded bores 22 available for use in engaging an axle shaft flange 24 thereto, using axle shaft/hub connector bolts 26. These bolts 26 may be of the type disclosed in US Patent Publication No. US2007/0023226 A1, the teachings of which are incorporated herein by reference. It is preferred, although not mandatory, that the bolts 26 be of the antichucking type, as disclosed in the cited Patent Publication.

Through use of such bolts 26, the axle shaft flange 24, and therefore the axle shaft 12, can be disconnected from the hub 14, allowing the hub 14 to rotate freely, without causing rotation of the axle shaft 12.

Such disconnection becomes necessary when the vehicle (not shown) is towed with the axle assembly 10, typically a rear axle assembly 10, on the ground, to avoid turning of the axle shaft 12. Heretofore, as stated previously, the axle shaft 12 has required removal and separate transport thereof. The need for removal and transport is eliminated through provision of the herein proposed separable axle shaft flange/hub connection.

Figure 2:
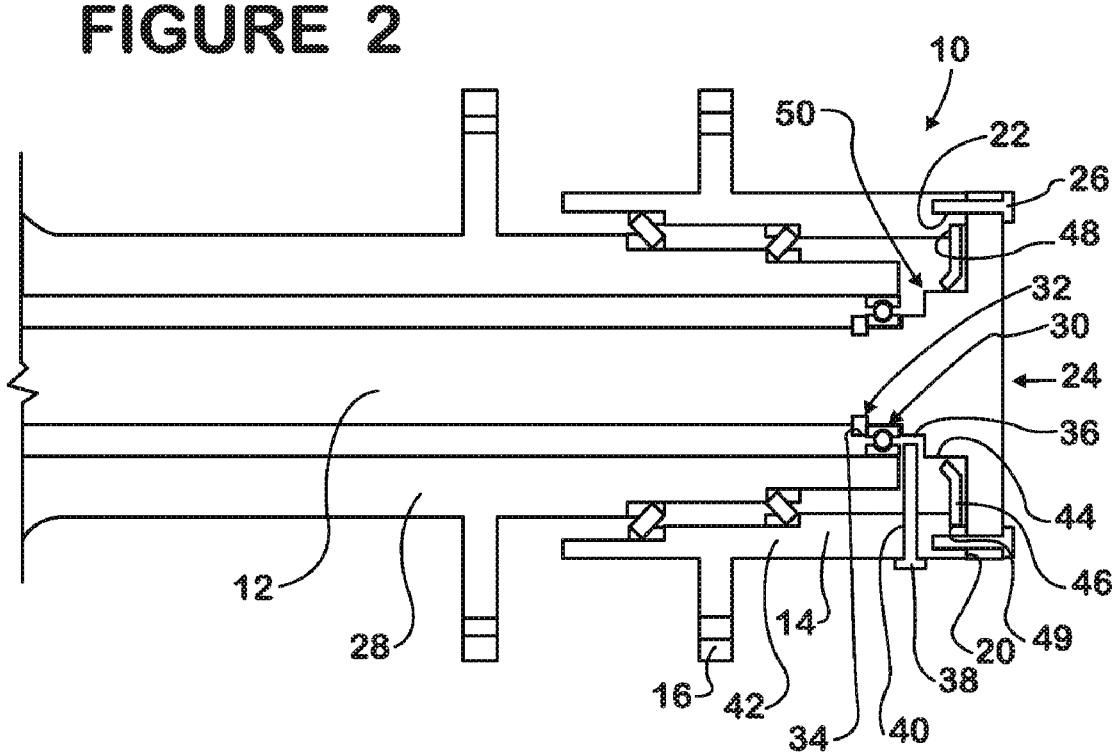
FIG. 2 is a longitudinal cross sectional view through the embodiment of FIG. 1.
Figure 3:
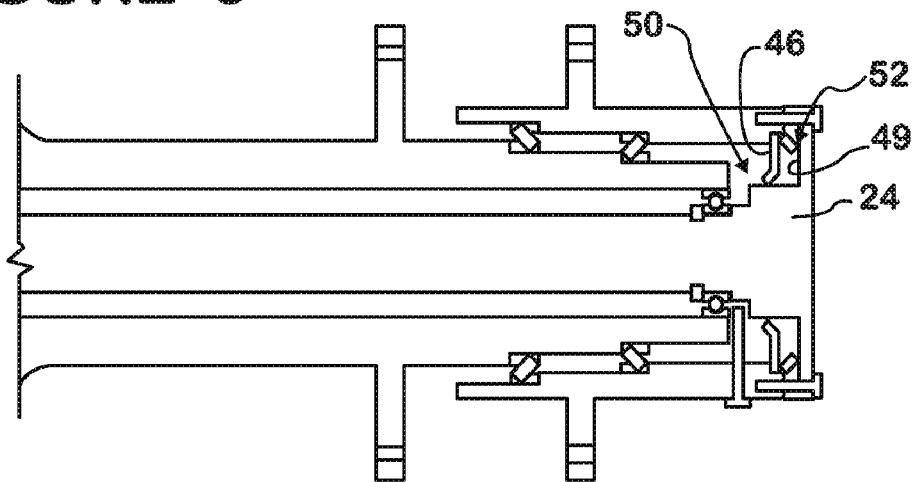
FIG. 3 is a longitudinal cross sectional view through another embodiment incorporating a spring to aid in separation of the axle shaft flange from the wheel end carrier or hub.

To maintain the axle shaft 12 centered within the hub 14 when the shaft flange 24 and hub 14 are disconnected, a bearing 30 is press fit onto the shaft 12 at a position proximal to the flange 24 yet providing a clearance fit relative to the axle housing 28, as best shown in FIGS. 2 and 3.

A snap ring 32 is seated in a groove 34 therefor, at a position proximal to the bearing 30, to ensure maintained position of the bearing 30 against a first proximal boss 36 of the shaft flange 24.

To keep the axle shaft 12 from "walking out" of the axle housing 28 when the shaft flange 24 is disconnected from the hub 14, an axle shaft retaining bolt 38 is passed through a bore 40 created in the sidewall 42 of the hub 14 and engages structures of the axle shaft flange 24 at a position between the first proximal boss 36, against which the bearing 30 abuts and a second, distal boss 44, maintaining the axle shaft within the axle housing 28 against "walking out" of same. The axle shaft retaining bolt 38 serves a secondary function as well, creating an oil fill port 40 for the hub 14 when removed.

Further, such axle shaft retaining bolt 38 will only otherwise require removal should the axle shaft 12 need to be removed for some reason.

Finally, a lip seal 46 is pressed or press fit into a counterbore 48 created in the hub 14 sidewall 42 at a position adjacent a radially outwardmost area 49 of radially downwardly stepped proximal surface 50 of the shaft flange 24, the lip seal 46 extending radially inwardly and riding along the surface of the second boss 44, maintaining oil within the area of connection between the hub 14 and the axle shaft 12, as required.

Turning now to FIG. 3, it is seen to be substantially identical to FIG. 2, except that an accessory spring 52, such as a Belleville spring 52, has been inserted between the lip seal 46 and the area 49 of the shaft flange 24 to aid in separating and maintaining separation of the hub 14 and shaft flange 24, as desired.

Thus, it will be understood that, upon removal of the axle shaft/hub retaining connectors 26, the vehicle may be towed with the rear axles on the ground, with turning of the wheels (and hub 14) thereof while the axle shafts 12 remain stationary. Further, the oil seal is not broken during such transport and the axle shaft/hub connectors 26 are simply reinstalled when the towed vehicle arrives at its destination, saving significant preparation time.

It will be further understood that the drive away axle assembly 10 of the present invention provides a number of advantages, some of which have been described above and others of which are inherent in the invention. Also, modifications may be proposed without departing from the teachings herein. Accordingly, the scope of the invention is only to be limited as necessitated by the accompanying claims.

The invention claimed is:

1. A drive away axle assembly comprising at least an axle shaft having a proximal end seated within an axle housing and a distal terminal flange and a hub having a distal end land and a sidewall, the distal terminal flange of the axle shaft having bores therein which align with threaded bores in the distal end land of the hub, axle shaft/hub connectors engaging through the bores to removably connect the hub to the axle shaft, and an axle shaft retaining bolt extending through the sidewall of the hub for engagement with the distal terminal flange to maintain the axle shaft within the axle housing when the axle shaft/hub connectors are removed, and allowing for independent rotation of the hub about the axle shaft, without imparting any rotation thereto, when such axle shaft/hub connectors are removed.

2. The assembly of claim 1 wherein the axle shaft/hub connectors are bolts.

3. The assembly of claim 2 wherein the bolts are antichucking bolts.

4. The assembly of claim 1 further including a bearing press fit onto the axle shaft at a position against a first proximal boss of the distal flange of the axle shaft.

5. The assembly of claim 4 wherein a peripheral snap ring groove is created in the axle shaft at a position adjacent and proximal to the position of the press fit bearing on the shaft.

6. The assembly of claim 5 wherein a snap ring is engaged within the snap ring groove.

7. The assembly of claim 1 further including a lip seal pressed into an interior counterbore in a sidewall of the hub and extending radially inwardly against a second boss of the axle shaft, distally adjacent the first boss.

8. The assembly of claim 7 wherein the axle shaft retaining bolt extends into a peripheral groove created between the bearing and a proximal wall of said second boss.

9. The assembly of claim 1 further including a spring positioned between the hub and the distal flange of the axle for aiding in creating and maintaining a separation between the distal flange of the axle shaft and the distal land of the hub when the axle shaft/hub connectors are removed.

\* \* \* \* \*